US006778350B2

(12) United States Patent
Bonin et al.

(10) Patent No.: US 6,778,350 B2
(45) Date of Patent: Aug. 17, 2004

(54) FEED FORWARD CONTROL OF VOICE COIL MOTOR INDUCED MICROACTUATOR DISTURBANCE

(75) Inventors: Wayne A. Bonin, North Oaks, MN (US); Zine-Eddine Boutaghou, Vadnais Heights, MN (US); Joel Limmer, Bloomington, MN (US); Andrew D. White, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 403 days.

(21) Appl. No.: 09/877,345

(22) Filed: Jun. 8, 2001

(65) Prior Publication Data

US 2002/0041462 A1 Apr. 11, 2002

Related U.S. Application Data

(60) Provisional application No. 60/238,752, filed on Oct. 6, 2000.

(51) Int. Cl.[7] ............................................. G11B 5/596
(52) U.S. Cl. .................................................. 360/78.05
(58) Field of Search ........................ 360/78.05, 78.12, 360/77.02, 78.09, 78.11, 75, 294.6

(56) References Cited

U.S. PATENT DOCUMENTS

| 3,924,268 | A |   | 12/1975 | McIntosh et al. ............. 360/78 |
| 4,374,402 | A |   | 2/1983 | Blessom et al. ............. 360/104 |
| 4,651,242 | A |   | 3/1987 | Hirano et al. ................ 360/103 |
| 4,736,353 | A | * | 4/1988 | Kasai et al. ............. 369/30.15 |
| 4,764,829 | A |   | 8/1988 | Makino ....................... 360/106 |
| 4,914,725 | A |   | 4/1990 | Belser et al. ................ 318/560 |
| 4,916,635 | A |   | 4/1990 | Singer et al. ................ 364/513 |
| 5,021,906 | A |   | 6/1991 | Chang et al. ................ 360/103 |
| 5,034,828 | A |   | 7/1991 | Ananth et al. ................ 360/75 |
| 5,177,652 | A |   | 1/1993 | Yamaguchi et al. ..... 360/78.05 |
| 5,189,578 | A |   | 2/1993 | Mori et al. .................. 360/106 |
| 5,218,585 | A | * | 6/1993 | Aviles et al. ............ 369/44.14 |
| 5,303,105 | A |   | 4/1994 | Jorgenson ................... 360/106 |
| 5,364,742 | A |   | 11/1994 | Fan et al. .................... 430/317 |
| 5,375,033 | A |   | 12/1994 | MacDonald ................ 361/281 |

(List continued on next page.)

FOREIGN PATENT DOCUMENTS

| EP | 0 412 221 B1 | 11/1989 | ........... G11B/21/02 |
| JP | 63-122069 | 5/1988 | ........... G11B/21/02 |

(List continued on next page.)

OTHER PUBLICATIONS

"Silicon Micromachined Electromagnetic Microactuators for Rigid Disk Drives" by Tang et al, *IEEE Transactions on Magnetcs*, vol. 31, No. 6, Nov. 1995.

(List continued on next page.)

*Primary Examiner*—David Hudspeth
*Assistant Examiner*—Fred F. Tzeng
(74) *Attorney, Agent, or Firm*—Kinney & Lange, P.A.

(57) ABSTRACT

A method is used for moving a transducing head between tracks of a disc in a dual-stage actuation assembly. The dual-stage actuation assembly has a main actuator for coarse positioning of the transducing head and a microactuator for fine positioning of the transducing head. The method comprises accelerating the main actuator during coarse positioning of the transducing head and applying control pulses to the microactuator during coarse positioning by the main actuator to eliminate oscillation of the microactuator during and after coarse positioning.

20 Claims, 9 Drawing Sheets

U.S. PATENT DOCUMENTS

| | | | |
|---|---|---|---|
| 5,521,778 A | | 5/1996 | Boutaghou et al. ......... 360/106 |
| 5,638,267 A | | 6/1997 | Singhose et al. ........... 364/148 |
| 5,657,188 A | | 8/1997 | Jurgenson et al. .......... 360/106 |
| 5,745,319 A | | 4/1998 | Takekado et al. ........ 360/78.05 |
| 5,764,444 A | | 6/1998 | Imamura et al. ............ 360/109 |
| 5,768,226 A | * | 6/1998 | Ogino ..................... 369/44.28 |
| 5,781,381 A | | 7/1998 | Koganezawa et al. ...... 360/106 |
| 5,796,558 A | * | 8/1998 | Hanrahan et al. ........ 360/294.6 |
| 5,801,472 A | | 9/1998 | Wada et al. ................ 310/309 |
| 5,805,375 A | | 9/1998 | Fan et al. ................ 360/78.12 |
| 5,808,435 A | * | 9/1998 | Mager ........................ 318/593 |
| 5,856,896 A | | 1/1999 | Berg et al. .................. 360/104 |
| 5,863,024 A | | 1/1999 | Blind et al. ............ 251/129.01 |
| 5,867,347 A | | 2/1999 | Knight et al. ............... 360/104 |
| 5,896,246 A | | 4/1999 | Budde et al. ............... 360/104 |
| 5,898,541 A | | 4/1999 | Boutaghou et al. ......... 360/109 |
| 5,898,544 A | | 4/1999 | Krinke et al. ............... 360/104 |
| 5,920,441 A | * | 7/1999 | Cunningham et al. ... 360/78.05 |
| 5,936,805 A | | 8/1999 | Imaino ....................... 360/104 |
| 5,945,898 A | | 8/1999 | Judy et al. .................... 335/78 |
| 5,959,808 A | | 9/1999 | Fan et al. .................... 360/106 |
| 6,005,742 A | * | 12/1999 | Cunningham et al. ... 360/78.05 |
| 6,006,614 A | * | 12/1999 | Guzik et al. ............... 73/865.6 |
| 6,032,531 A | * | 3/2000 | Roszhart ................... 73/504.04 |
| 6,034,834 A | * | 3/2000 | Yoshikawa et al. ........... 360/75 |
| 6,043,957 A | | 3/2000 | Hattori et al. .............. 360/106 |
| 6,064,550 A | | 5/2000 | Koganezawa ............... 360/106 |
| 6,088,187 A | * | 7/2000 | Takaishi ................... 360/78.05 |
| 6,289,564 B1 | | 9/2001 | Novotny .................... 29/25.35 |
| 6,320,720 B1 | * | 11/2001 | Hattori .................... 360/78.05 |
| 6,490,119 B1 | * | 12/2002 | Mittal et al. ............. 360/78.05 |
| 6,493,172 B1 | * | 12/2002 | Morris et al. ............ 360/77.02 |
| 6,493,177 B1 | * | 12/2002 | Ell et al. .................. 360/78.05 |
| 6,519,109 B1 | * | 2/2003 | Price et al. .............. 360/78.09 |
| 6,542,326 B1 | * | 4/2003 | Ell et al. .................. 360/78.05 |
| 6,587,303 B1 | * | 7/2003 | Bui et al. ................. 360/78.12 |
| 6,600,619 B1 | * | 7/2003 | Morris et al. .................. 360/75 |

FOREIGN PATENT DOCUMENTS

| | | | | |
|---|---|---|---|---|
| JP | 02-263369 | 4/1989 | ........... | G11B/21/10 |
| JP | 04-134681 | 5/1992 | ........... | G11B/21/10 |
| JP | 04-368676 | 12/1992 | ........... | G11B/21/08 |
| JP | 05-094682 | 4/1993 | ........... | G11B/21/21 |
| JP | 06-020412 | 1/1994 | ........... | G11B/21/10 |
| JP | 07-085621 | 3/1995 | ........... | G11B/21/20 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp 119–126.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

FEED FORWARD CONTROL OF VOICE COIL MOTOR INDUCED MICROACTUATOR DISTURBANCE

CROSS-REFERENCE TO RELATED APPLICATION(S)

This application claims priority from Provisional Application No. 60/238,752, filed Oct. 6, 2000, for "FEED FORWARD CONTROL OF VCM INDUCED MICROACTUATOR DISTURBANCE" by Wayne Bonin, Zine-Eddine Boutaghou, Joel Limmer, and Andrew White.

BACKGROUND OF THE INVENTION

The present invention relates to a method for eliminating ringing of the microactuator during voice coil motor (VCM) actuator seeking in a dual-stage actuation system for a disc drive.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor (VCM), to radially position a slider (which carries the head) on a flexure at the end of the actuator arm. The large-scale motor lacks sufficient resolution to effectively accommodate high track-density discs. Thus, a high resolution head positioning mechanism, or microactuator is necessary to accommodate the more densely spaced tracks.

One particular design for high resolution head positioning involves employing a high resolution microactuator in addition to the conventional lower resolution actuator motor, thereby affecting head positioning through dual-stage actuation. Various microactuator designs have been considered to accomplish high resolution head positioning. Microactuators typically include a stator portion and a rotor portion, the stator being attached to the flexure and the rotor supporting the slider. The rotor is movable with respect to the stator such that the slider can be positioned more precisely over a track of a disc.

The microactuator has suspension springs which can be arranged to provide linear motion of the slider by the microactuator. Linear microactuators are preferred to rotary microactuators because of their ability to use passive mechanical filtering to reject significant disturbances caused by windage excitations of the suspension load beam. However, a disadvantage of linear microactuators is the inability to control large amplitude ringing caused by the VCM actuator seeking. During seek acceleration of the VCM to coarsely position the actuator arm, the entire microactuator is in linear motion and large amplitude ringing occurs. The acceleration force of the VCM causes the suspension springs in the microactuator to oscillate the rotor carrying the slider within the stator at a resonant frequency causing the large amplitude ringing. The ringing requires some means of control to avoid excessive settling time for damping the oscillation. There exists a need in the art for the linear microactuator to balance the VCM seek acceleration and thereby eliminate the ringing without increasing the seek time for the VCM.

BRIEF SUMMARY OF THE INVENTION

The present invention is a method for moving a transducing head between tracks of a disc in a dual-actuation assembly. The dual-actuation assembly has a main actuator for coarse positioning of the transducing head and a microactuator for fine positioning of the transducing head. The method comprises accelerating the main actuator during coarse positioning of the transducing head and applying control pulses to the microactuator during coarse positioning by the main actuator.

In one preferred embodiment of the present invention four control pulses are applied to the microactuator during coarse positioning by the main actuator. The application of control pulses to the microactuator eliminates ringing by the microactuator during and after coarse positioning of the transducing head.

DETAILED DESCRIPTION

Figure 1:
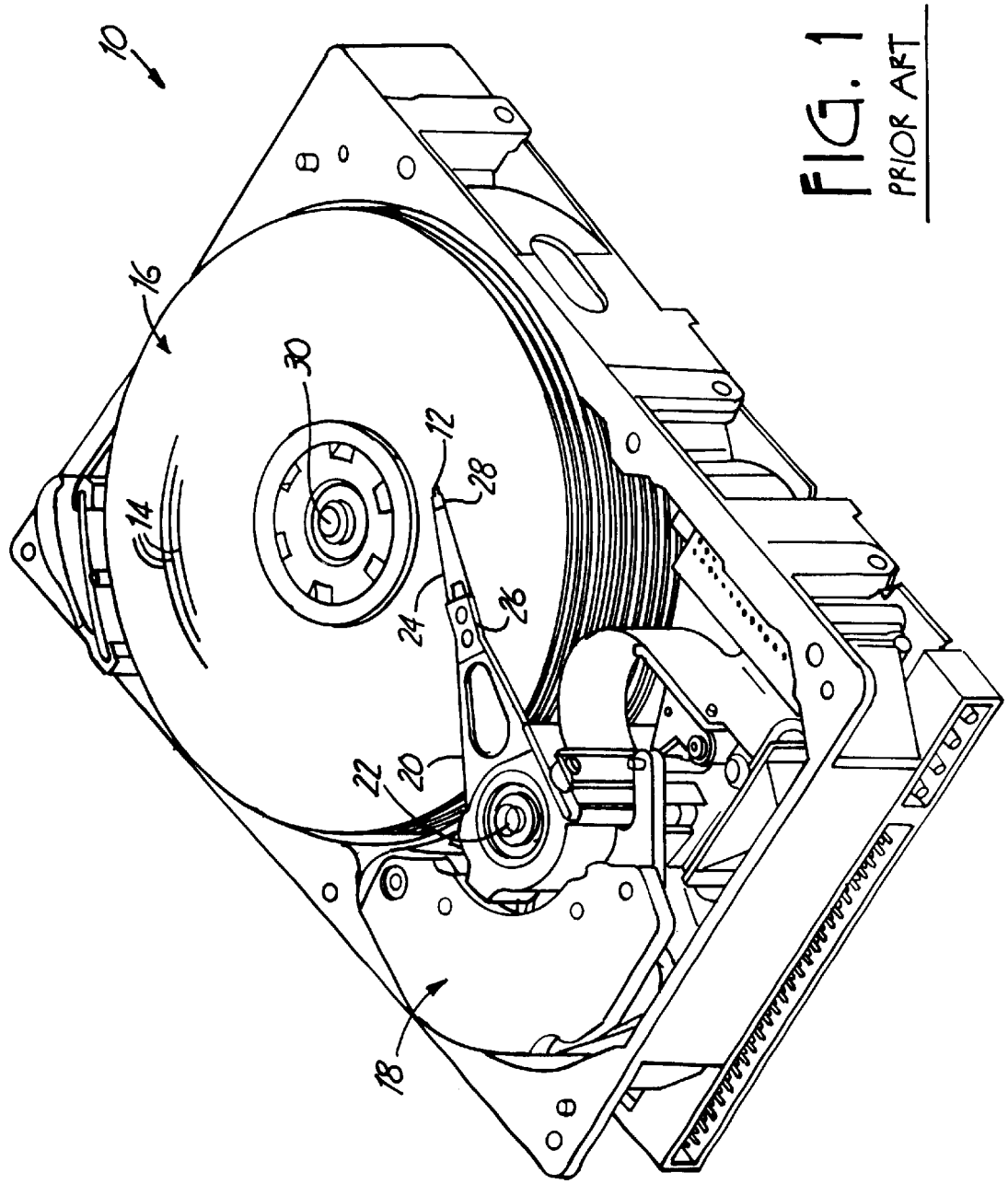
FIG. 1 is a perspective view of a conventional disc actuation system for positioning a slider over a track of a disc.

FIG. 1 is a perspective view of a disc drive actuation system 10 for positioning a slider 12 over a track 14 of a disc 16. Actuation system 10 includes a voice coil motor (VCM) 18 (or main actuator) arranged to rotate an actuation arm 20 on a spindle around an axis 22. A head suspension 24 is connected to actuator arm 20 at a head mounting block 26. A flexure 28 is connected to an end of head suspension 24, and carries slider 12. Slider 12 carries a transducing head (not shown in FIG. 1) for reading and/or writing data on concentric tracks 14 of disc 16. Disc 16 rotates around axis 30, so that windage is encountered by slider 12 to keep slider 12 aloft a small distance above the surface of disc 16.

VCM 18 is selectively operated to move actuator arm 20 about axis 22, thereby moving slider 12 between tracks 14 of disc 16. However, for disc drive systems with high track density, VCM 18 lacks significant resolution and frequency response to position a transducing head on slider 12 precisely over a selected track 14 of disc 16. Therefore, a high resolution actuation device is necessary.

Figure 2:
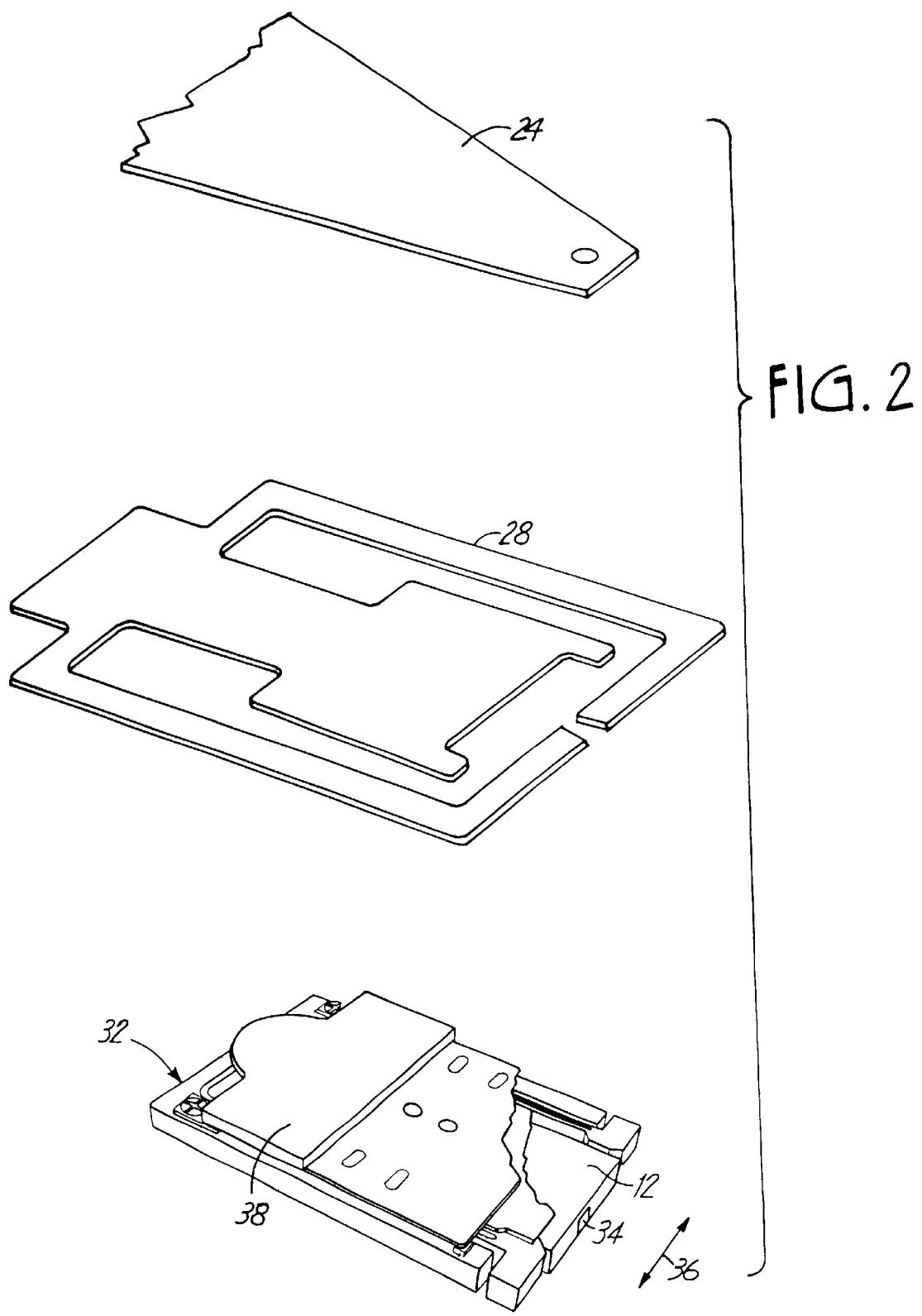
FIG. 2 is an exploded perspective view of a portion of a disc drive including a microactuator.

FIG. 2 is an exploded perspective view of a portion of the disc drive including microactuator 32 for high resolution head positioning. Flexure 28 is attached to head suspension 24 and microactuator 32 is attached to flexure 28. Microactuator 32 carries slider 12 above a surface of disc 16. Transducing head 34 is carried by slider 12 to write and read the data to and from the disc. In operation head suspension 24, flexure 28, and microactuator 32 carrying slider 12 are all moved together as coarse positioning is performed by VCM 18 (FIG. 1) moving actuator arm 20 (FIG. 1). To achieve fine positioning of transducing head 34, microactuator 32 generates a force which causes bending of beam springs located on the microactuator. As a result, the portion of microactuator 32 carrying slider 12 moves slightly with respect to flexure 28 in the direction of arrows 36, displacing transducing head 34 with high resolution for precise positioning of transducing head 34 over a selected track of the disc.

Figure 3:
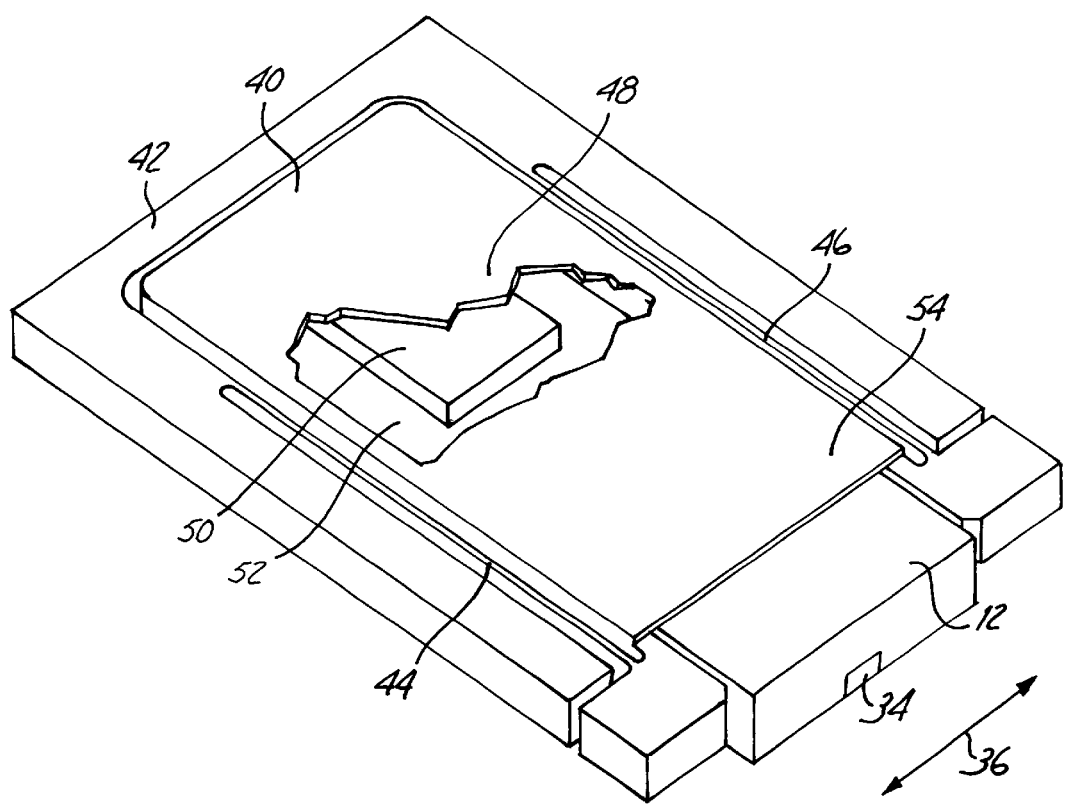
FIG. 3 is a top perspective view of a microactuator with a coil assembly removed.

Although many types of microactuators may be used with the method of the present invention, in FIGS. 2 and 3 magnetic microactuators are used as an example of one type of microactuator. With magnetic microactuators, to achieve fine positioning of transducing head 34, microactuator 32 generates a force from a magnetic circuit created with a coil assembly 38 which finely positions the transducing head 34 over a selected track of the disc.

FIG. 3 is a top perspective view of microactuator 32 with coil assembly 38 removed. Microactuator 32 has a rotor 40 operatively connected to a stator 42 by suspension springs 44 and 46. The suspension springs of the present embodiment of microactuator 32 are arranged to enable linear motion of slider 12. Rotor 40 has a magnet tub cap 48 (cutaway view), a magnet 50, a keeper 52, and a slider tub cap 54. Slider tub cap 54 carries slider 12, and thereby transducing head 34. To actuate microactuator 32, a magnetic circuit is created between magnet 50 and a coil located in coil assembly 38 (shown in FIG. 2). A current is driven through the coil to cause actuation of microactuator 32. In operation, microactuator 32 moves rotor 40 within stator 42 in the direction of arrows 36. The movement of rotor 40, and thereby slider tub cap 54, finely positions slider 12, and thereby transducing head 34, over a track of the disc. Although FIG. 3 shows one configuration of a linear microactuator, those skilled in the art will recognize that many other linear microactuators may be used in the present invention.

As can be seen in FIGS. 1 and 2, during seek acceleration of VCM 18, actuator arm 20 is moved over the surface of disc 16 to coarsely position transducing head 34. Stator 42 of microactuator 32 is connected to flexure 28 which is attached to head suspension 24 and head suspension 24 is attached to actuator arm 20. Thus, when VCM 18 moves actuator arm 20, microactuator 32 is in linear motion as well. Slider 12 is carried by rotor 40 of microactuator 32 and is connected to stator 42 by springs 44 and 46. The acceleration force of VCM 18 during seek is transferred through suspension springs 44 and 46 to cause undesirable deflection of rotor 40 with respect to stator 42. Rotor 40 and suspension springs 44, 46 have a resonant frequency. Seek acceleration transfers the acceleration force of VCM 18 to rotor 40, thereby creating a large amplitude oscillation of rotor 40 at the resonant frequency. The large amplitude oscillation results in rotor disturbance or ringing. The present invention comprises a method to eliminate the rotor disturbance ringing.

Figure 4:
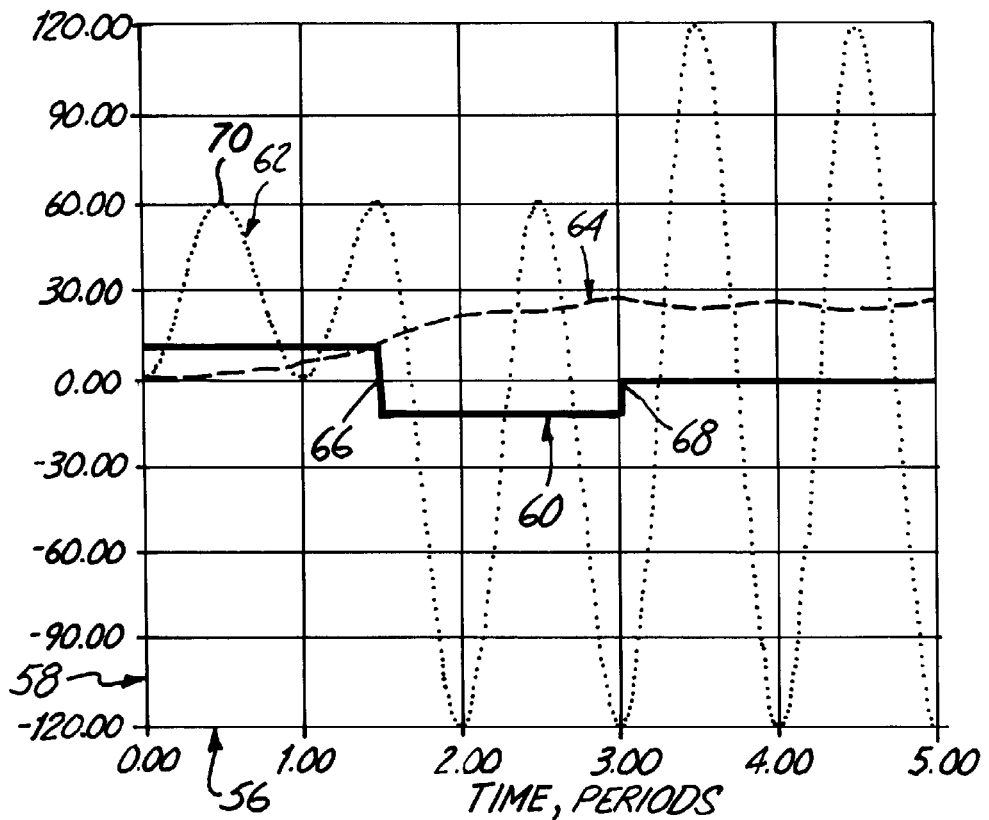
FIG. 4 is a graph of a prior art microactuator rotor disturbance.

FIG. 4 is a graph of rotor disturbance in microactuator 32 generated by VCM 18 seek acceleration. Although FIG. 4 has results and values specific to the microactuator shown in FIG. 3, similar results and values occur for other linear microactuators known in the art. The X-axis 56 of FIG. 4 is measured by time in microactuator resonant periods. Each line shown in the graph of FIG. 4 is measured in different units related to what the specific line represents. Thus, the Y-axis 58 of FIG. 4 is measured in units specific to each line shown in the graph. Line 60 represents the acceleration profile of VCM 18 at stator 42 of microactuator 32 during seek acceleration displayed in hundreds of meters per seconds squared (100's of m/s$^2$). Line 62 represents the displacement of rotor 40 within stator 42, displayed in microns ($\mu$m). Line 64 represents the displacement of rotor 40 with respect to VCM 18, displayed in millimeters scaled by a factor of 10 (mm×10).

Seek acceleration by VCM 18 lasts for a seek time before acceleration stops and the transducing head reaches its desired location on the disc. VCM 18 typically operates at a maximum acceleration, thus depending on the distance the transducing head must travel seek time will vary each time coarse positioning occurs. In an exemplary embodiment of the method of the present invention, the seek time for VCM 18 is at least two milliseconds. As can be seen by FIG. 4, the seek time for VCM 18 to reach its desired position is equal to approximately three microactuator resonant periods. Since seek time varies based on the distance the transducing head travels and microactuator resonant periods vary by microactuator, the seek time to microactuator resonant period ratio will vary depending on displacement of the transducing head and microactuator used. The present invention provides a solution for disc drives having a seek time longer than two microactuator resonant periods.

During seek acceleration (as shown by line 60), VCM 18 moves actuator arm 20 to coarsely position slider 12 over a specific track of a disc. Seek acceleration begins by accelerating VCM 18 for approximately half the seek time required to reach the desired position. VCM 18 switches to deceleration at point 66 and lasts for approximately half the seek time. Seek acceleration of VCM 18 stops at point 68 when the seek time ends.

Line 62 shows the displacement of rotor 40 within microactuator 32 during seek acceleration by VCM 18. During each step of seek acceleration, the amplitude displacement of rotor 40 increases. The large amplitude displacement results in the ringing of microactuator 32 and the ringing increases at each step of VCM acceleration. Natural damping of the microactuator takes approximately two hundred microactuator resonant periods for the ringing to stop, thereby resulting in excessive settling time before fine positioning of microactuator 32 can occur. Resonant periods vary by microactuator. In the example shown in FIG. 4, the seek time is equal to approximately three resonant periods.

The method of the present invention predeflects rotor 40 to the position the rotor would have during steady state acceleration and deceleration and keeps rotor 40 from oscillating, thereby eliminating the ringing disturbance. The first peak of rotor displacement occurs approximately one half of a resonant period after the start of VCM acceleration, as can be seen at point 70 in FIG. 4. At point 70, the amplitude of the rotor displacement is approximately twice the steady state displacement that would be obtained with constant acceleration. The velocity of rotor 40 at peak displacement is zero. If rotor displacement at point 70 could be reduced to the steady state displacement of rotor 40 while keeping the velocity of rotor 40 at zero the ringing would be eliminated. Generating a force in microactuator 32 when acceleration of VCM 18 begins eliminates the ringing and keeps displacement of rotor 40 at its steady state while maintaining the velocity of rotor 40 at zero. The force generated in microactuator 32 has a magnitude capable of generating a force opposite and approximately equal to half of the VCM acceleration force. Pulses of current are applied to microactuator 32 to generate half of the force necessary to deflect rotor 40 to its steady state position and keep rotor 40 from oscillating. As the acceleration increases or decreases the magnitude of the pulses of current are increased or decreased to track the acceleration force. Each pulse of current lasts approximately half a resonant period.

Figure 5:
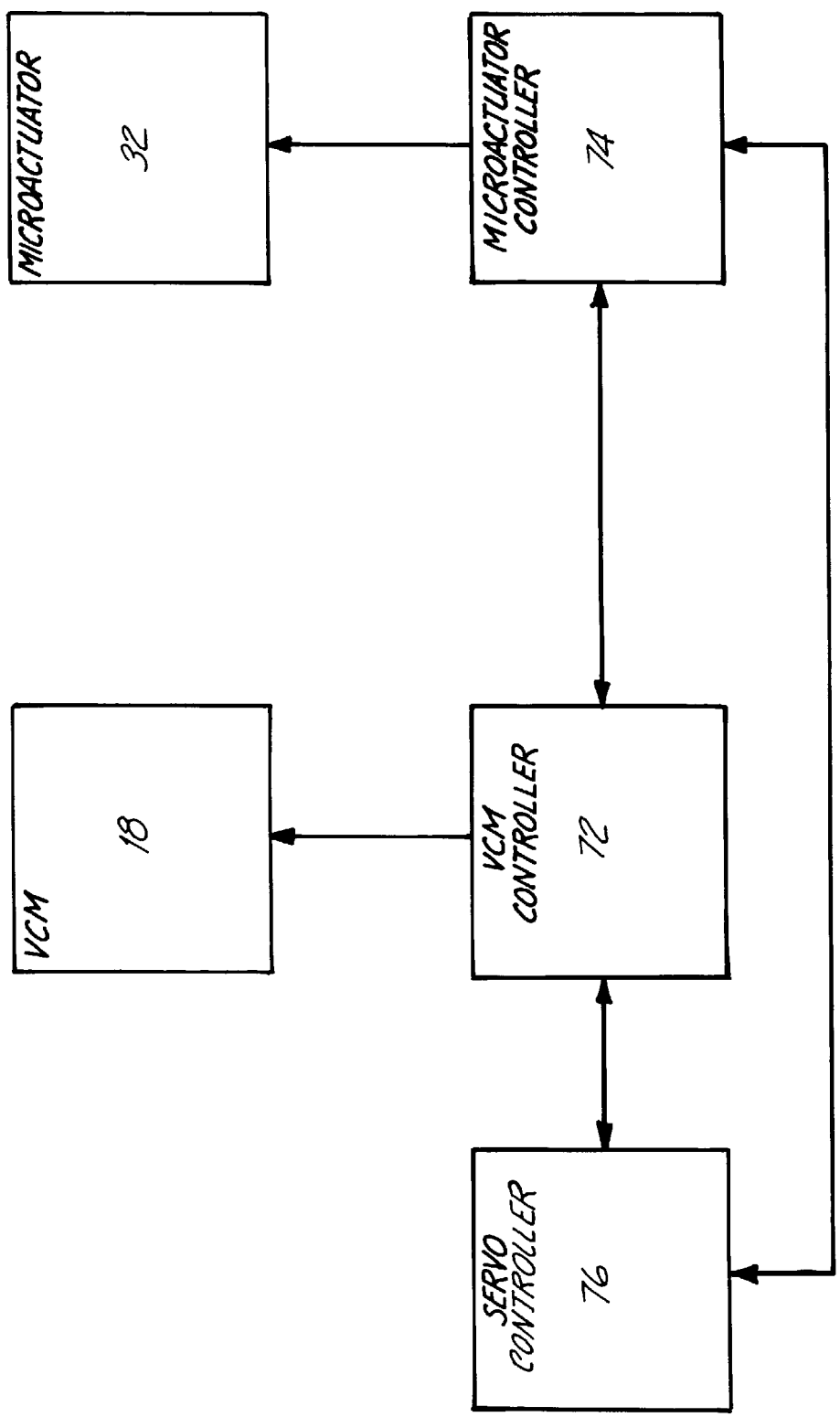
FIG. 5 is a schematic block diagram of an electrical circuit for the dual-stage actuation system of the present invention.

FIG. 5 is a schematic block diagram of the electrical circuit and feedback system between VCM 18 and microactuator 32. VCM 18 is operated efficiently by a VCM controller 72. Microactuator 32 is operated by microactuator controller 74 and microactuator controller 74 operates microactuator 32 efficiently. VCM controller 72 and microactuator controller 74 are in communication with each other and servo controller 76. The total amount of track movement needed to position slider 12 (as seen in FIG. 1) is provided by servo controller 76. Servo controller 76 distributes movement between VCM 18 and microactuator 32 and controls the general movement profile. Servo controller 76 also provides feedback to VCM controller 72 and microactuator controller 74. Once VCM seek acceleration begins, VCM controller 72 and microactuator controller 74 communicate with each other, thereby allowing microactuator controller 74 to apply pulses of current to microactuator 32 at the correct times during seek by VCM 18.

Figure 6:
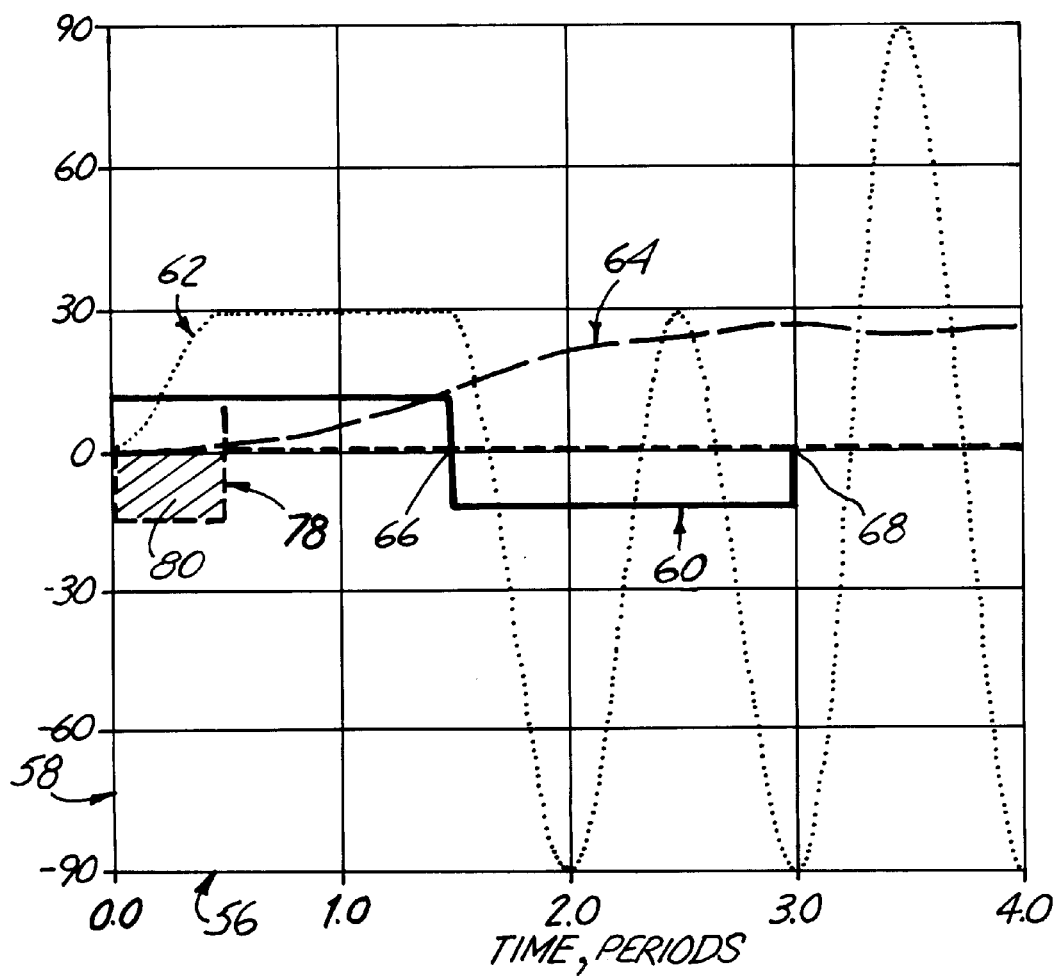
FIG. 6 is a graph of a microactuator rotor disturbance partially removed by the application of a single microactuator force pulse.

FIG. 6 shows a graph illustrating disturbance of rotor 40 after a first pulse of current has been applied to microactuator 32. The graph shows VCM acceleration at slider 12 (line 60), rotor displacement with respect to stator 42 (line 62) and rotor displacement with respect to the drive (line 64). Also shown is line 78 representing microactuator force (mN×10), that is the force generated by the pulse of current in the coil of microactuator 32. The first pulse of current holds rotor 40 in its position during steady state acceleration. The application of the first pulse of current to microactuator 32 creates microactuator force, as seen by area 80, approximately equal and opposite to half of the VCM acceleration force for the first resonant period. After approximately half of a resonant period, rotor displacement reaches its steady state and lasts until the VCM acceleration switches at point 66 (as can be seen by line 62). Rotor velocity during this time is zero. There is no ringing of rotor 40 as the force generated by microactuator 32 keeps rotor 40 from oscillating, thereby eliminating the ringing until the VCM acceleration switch at point 66.

At point 66, midway through VCM seek acceleration, acceleration of VCM 18 switches from positive (acceleration) to negative (deceleration). The change in VCM acceleration force at the mid seek acceleration switch is twice as large as the change in acceleration force when VCM acceleration began. A single pulse of current lasting half a resonant period applied to microactuator 32 would need twice the amplitude to control the ringing generated by the VCM acceleration switch at point 66 as the amplitude of the first pulse of current necessary to control the ringing generated at the start of VCM acceleration. However, the same control over the mid-seek acceleration switch can be achieved by applying two separate pulses of current to microactuator 32. Using two current pulses of the same amplitude to control oscillations results in approximately half of the total energy input into microactuator 32 as using a single pulse of current with a large amplitude. Power is proportional to the square of the current amplitude. By using pulses of current with small amplitudes, the amount of power dissipated is reduced. That is, if only half as much current is used to control oscillations, less power is used.

Figure 7:
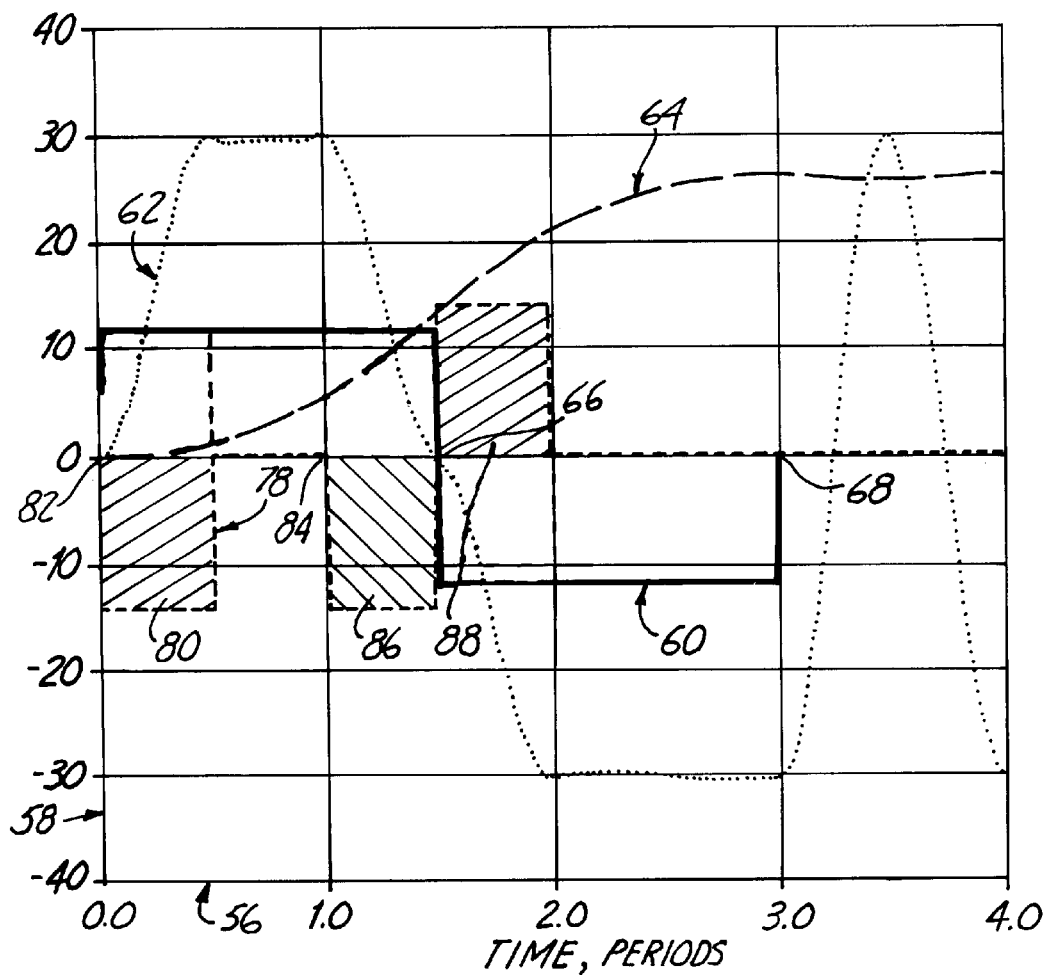
FIG. 7 is a graph of the microactuator rotor disturbance partially removed by the application of three microactuator force pulses.

FIG. 7 shows a graph illustrating disturbance of rotor 40 after the first, second and third pulses of current are applied to microactuator 32. The graph shows VCM acceleration at slider 12 (line 60), displacement of rotor 40 with respect to stator 42 (line 62), displacement of rotor 40 with respect to the drive (line 64) and microactuator force generated by the pulse of current to microactuator 32 (line 78). The first pulse of current is applied to microactuator 32 when VCM acceleration begins at point 82. The second pulse of current is applied to microactuator 32 approximately half of a resonant period before, at point 84, the VCM mid-seek acceleration switch occurs. The third pulse of current is applied to microactuator 32 approximately when the VCM mid-seek acceleration switch occurs at point 66.

The second pulse of current applied to microactuator 32 lasts for half of a resonant period. The second pulse of current is negative and predeflects rotor 40 to the position the rotor would have during steady state acceleration. That is, the second pulse of current brings the displacement of rotor 40 to zero at the VCM mid-seek acceleration switch. The second pulse of current creates a microactuator force, as seen by area 86, opposite and approximately equal to half of the VCM acceleration force for the resonant period prior the acceleration switch.

The third pulse of current applied to microactuator 32 begins at the VCM acceleration switch and lasts half a resonant period. The third pulse of current keeps rotor 40 in the position the rotor would have during steady state deceleration and thereby prevents rotor 40 from oscillating. The third pulse of current acts on the deceleration of VCM 18 by creating a microactuator force, as seen by area 88, opposite and approximately equal to half of the VCM acceleration force after the mid-seek acceleration switch.

The application of the second and third pulses keeps rotor 40 at its steady state displacement and zero velocity until acceleration stops at point 68. However, after seek acceleration is completed at point 68 large amplitude oscillations would occur in the absence of a force sufficient to predeflect rotor 40 to its resting position and keep the rotor from oscillating.

Figure 8:
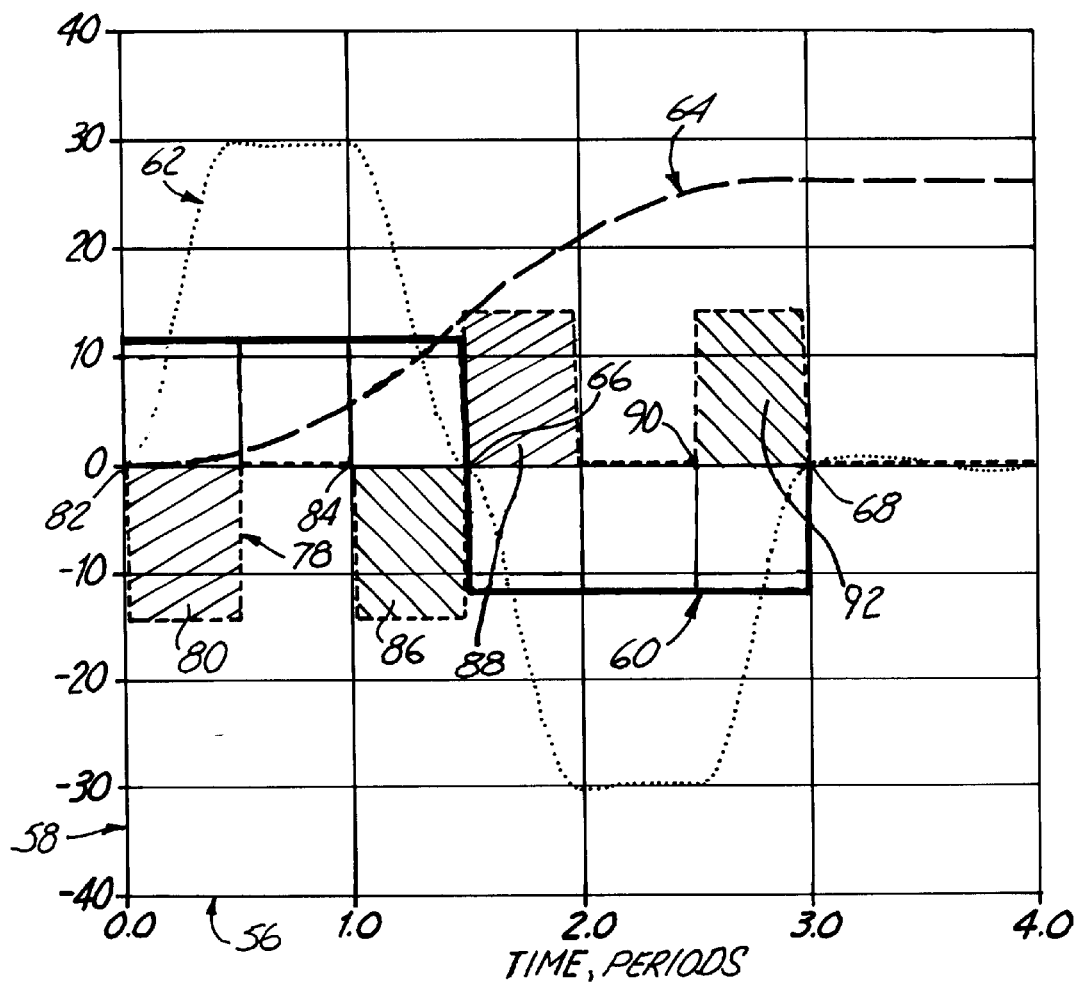
FIG. 8 is a graph of the microactuator rotor disturbance completely removed by the application of four microactuator force pulses.

FIG. 8 shows a graph illustrating disturbance of rotor 40 after a fourth pulse of current is applied to microactuator 32. Applying a fourth pulse of current eliminates the ringing completely. The graph shows VCM acceleration at slider 12 (line 60), displacement of rotor 40 with respect to stator 42 (line 62), displacement of rotor 40 with respect to the drive (line 64) and microactuator force generated by the pulse of current (line 78). After the first, second, and third pulses of current are applied to microactuator 32, the fourth pulse of current is applied approximately half of a resonant period, at point 90, before seek acceleration of VCM 18 is completed. The fourth pulse of current lasts approximately half of a resonant period. The fourth pulse of current generates a microactuator force, as seen by area 92, opposite and approximately equal to half of the VCM acceleration force. The fourth pulse of current predeflects rotor 40 back to a displacement of zero such that the rotor velocity returns to zero at the same time VCM acceleration stops. Thus, slider 12 (carrying transducing head 34) supported by rotor 40 will be settled and able to perform read-write functions as soon as VCM acceleration is completed.

The method of the present invention eliminates the ringing caused by a large amplitude displacement of rotor 40 during seek by VCM 18. Four pulses of current, each lasting half of a resonant period, are applied to microactuator 32 during VCM seek acceleration. Each pulse of current applied to the microactuator has an amplitude that is approximately equal and opposite to half of the VCM acceleration force for the duration of the pulse of current. The first pulse begins when VCM seek begins. The second pulse starts half of a resonant period before VCM 18 switches from acceleration to deceleration and the third pulse starts at the VCM acceleration switch. Finally, the fourth pulse is applied half of a resonant period before the seek acceleration of VCM 18 stops. The pulses of current generate a force in microactuator 32 that eliminates large amplitude displacement of rotor 40. The fourth pulse of current creates a microactuator force opposite and approximately equal to half of the VCM acceleration force. Thus, there is no ringing caused by seek acceleration of VCM 18. The pulses of current predeflect rotor 40 to its steady state position and keeps rotor 40 from oscillating before the VCM acceleration force can start large amplitude displacement of rotor 40.

Figure 9:
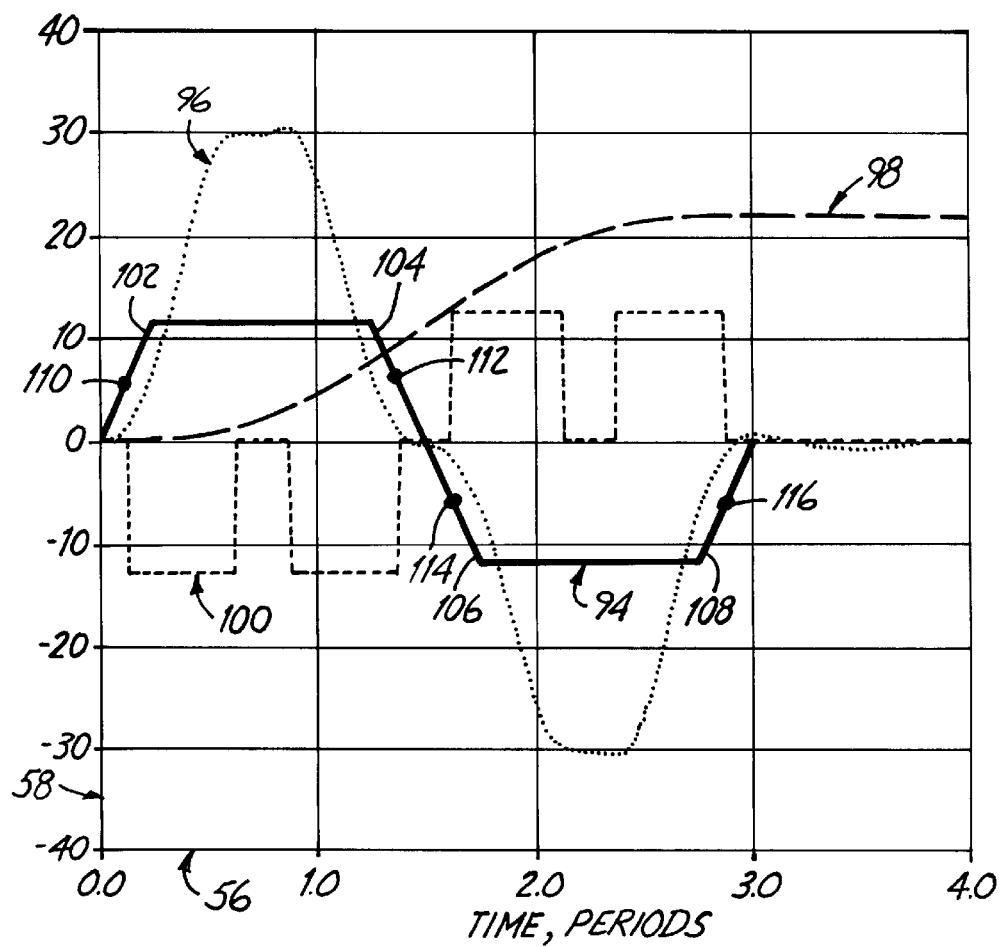
FIG. 9 is a graph of an alternative method for the microactuator rotor disturbance to be completely removed.
Figure 9:
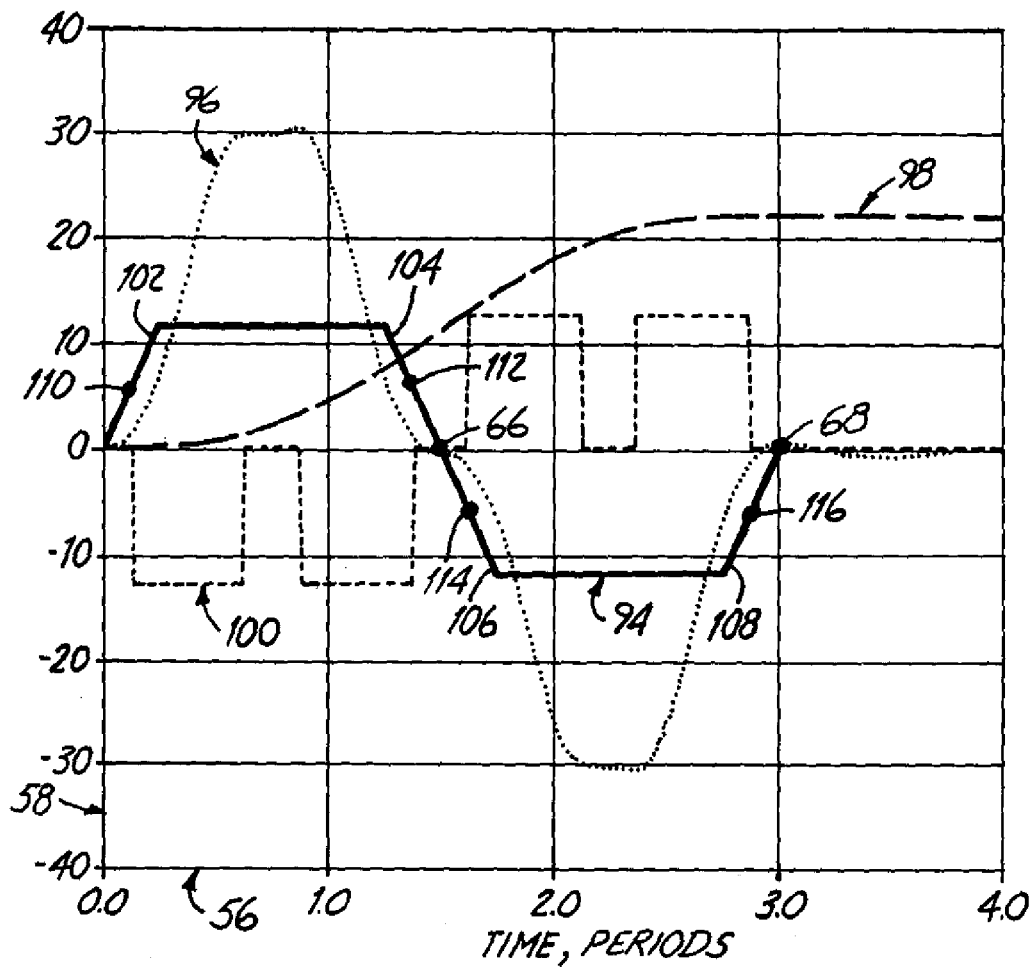

FIG. 9 is a graph illustrating disturbance of rotor 40 utilizing the present invention method and having an alternative VCM seek acceleration profile. Line 94 represents the acceleration of VCM 18 (100's of m/s$^2$). Line 96 represents rotor 40 displacement with respect to stator 42 ($\mu$m), line 98 represents rotor 40 displacement with respect to the drive (mm×10), and line 100 represents microactuator force generated by the pulse of current to microactuator 32 (mN×10). VCM 18 accelerates gradually to its peak acceleration, shown by the ramped VCM acceleration profile of line 94. Positive VCM acceleration lasts for approximately half the seek time. VCM 18 gradually increases to its top acceleration and will decrease such that the acceleration switch from positive to negative occurs at point 66 after approximately half the seek time has passed. Deceleration of VCM 18 also lasts for approximately half the seek time. VCM 18 decelerates such that VCM seek acceleration is completed at point 68 when the seek time ends. Line 94 shows the VCM acceleration profile for the alternative VCM seek acceleration. Four acceleration ramps 102, 104, 106, and 108 show the gradual positive and negative acceleration of VCM 18.

To operate rotor 40 at its steady state displacement and eliminate large amplitude oscillations causing ringing disturbance, four pulses of current are applied to microactuator 32. Each pulse of current lasts for half of a resonant period. The start or end of each pulse is set to the mid-point of each acceleration ramp. The first pulse of current is applied to microactuator 32 at point 110, the second pulse of current is applied at point 112, the third pulse of current is applied at point 114 and the fourth pulse of current is applied at point 116. The pulses of current generate a microactuator force opposite and approximately equal to half of the VCM acceleration force. The four pulses of current pre-deflect rotor 40 to the position it would have during steady state seek acceleration of VCM 18 and keeps rotor 40 from having large amplitude oscillations. The four pulses of current eliminate the large amplitude oscillations and thereby the ringing disturbance.

The method of the present invention eliminates microactuator disturbances caused by VCM seek acceleration without increasing the total VCM seek time. The method generates a force within the microactuator to control the microactuator against the effects of coarse positioning by the VCM. During VCM seek acceleration the suspension springs traditionally oscillate the rotor within the stator, causing large amplitude oscillation and ringing of the microactuator. The present invention is a method that eliminates the ringing by applying four control pulses to the microactuator during VCM seek acceleration. The four pulses generate a microactuator force opposite to approximately half of the VCM acceleration force and prevent the large amplitude oscillations of the rotor. The pulses predeflect the rotor during VCM seek acceleration to the position the rotor would have during steady state acceleration, thereby eliminating the large amplitude oscillations and ringing. By applying the pulses to the microactuator at specific points during VCM seek acceleration, the ringing can be eliminated without increasing the total VCM seek time. Furthermore, the present invention method reduces the power dissipated by the microactuator. Since power is proportional to the square of the current amplitude, reducing the current amplitude reduces the power dissipated. The use of multiple pulses of current having small current amplitudes rather than a single pulse having a large current amplitude lowers the power dissipated by the microactuator.

Although the present invention has been described with reference to preferred embodiments, workers skilled in the art will recognize that changes may be made in form and detail without departing from the spirit and scope of the invention.

What is claimed is:

1. A method for moving a transducing head between tracks of a disc in a dual-actuation assembly having a main actuator for coarse positioning of the transducing head and a microactuator for fine positioning of the transducing head, the method comprising:

accelerating the main actuator during coarse positioning of the transducing head; and operating the microactuator to eliminate ringing of the microactuator at the end of coarse positioning by the main actuator.

2. A method for moving a transducing head between tracks of a disc in a dual-actuation assembly having a main actuator for coarse positioning of the transducing head and a microactuator for fine positioning of the transducing head, the method comprising:

accelerating the main actuator during coarse positioning of the transducing head; and generating a force a plurality of times in the microactuator during coarse positioning by the main actuator.

3. The method of claim 2 wherein generating the force a plurality of times comprises applying pulses of current to the microactuator during coarse positioning by the main actuator.

4. The method of claim 3 wherein each pulse lasts for approximately half of a microactuator resonant period.

5. The method of claim 2 wherein coarse positioning lasts for a seek time and the seek time is at least two microactuator resonant periods.

6. The method of claim 5 wherein the accelerating step comprises:

accelerating the main actuator for about half of the seek time;

decelerating the main actuator for about half of the seek time; and stopping acceleration of the main actuator when the seek time ends.

7. The method of claim 6 wherein a first pulse of current is applied to the microactuator when acceleration of the main actuator begins.

8. The method of claim 6 wherein a second pulse of current is applied to the microactuator about half of a microactuator resonant period before the main actuator switches to deceleration.

9. The method of claim 6 wherein a third pulse of current is applied to the microactuator about when the main actuator switches to deceleration.

10. The method of claim 6 wherein a fourth pulse of current is applied to the microactuator about half of a microactuator resonant period before acceleration of the main actuator stops.

11. The method of claim 2 wherein the force causes the microactuator to oppose an acceleration force of the main actuator.

12. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:
- a main actuator for coarse positioning of the transducing head;
- a microactuator for fine positioning of the transducing head; and
- a control system for coordinating operation of the main actuator and the microactuator to eliminate oscillation of the microactuator at the end of coarse positioning by the main actuator.

13. The disc drive of claim 12 wherein the control system causes the microactuator to generate a force a plurality of times during coarse positioning of the main actuator.

14. The disc drive of claim 13 wherein the force is generated by a pulse of current.

15. The disc drive of claim 12 wherein coarse positioning lasts for a seek time and the seek time is at least two microactuator resonant periods.

16. The disc drive of claim 15 wherein during coarse positioning the main actuator accelerates for about half the seek time and decelerates for about half the seek time before acceleration stops when the seek time ends.

17. The disc drive of claim 16 wherein the control system supplies a first pulse of current to the microactuator when acceleration of the main actuator begins.

18. The disc drive of claim 16 wherein the control system supplies a second pulse of current to the microactuator about half of a microactuator resonant period before the main actuator switches to deceleration.

19. The disc drive of claim 16 wherein the control system supplies a third pulse of current to the microactuator about when the main actuator switches to deceleration.

20. The disc drive of claim 16 wherein the control system supplies a fourth pulse of current to the microactuator about half of a microactuator resonant period before acceleration of the main actuator stops.

* * * * *

UNITED STATES PATENT AND TRADEMARK OFFICE
CERTIFICATE OF CORRECTION

PATENT NO. : 6,778,350 B2  
DATED : August 17, 2004  
INVENTOR(S) : Wayne A. Bonin et al.

It is certified that error appears in the above-identified patent and that said Letters Patent is hereby corrected as shown below:

Delete Drawing sheet 9 and substitute therefor Drawing sheet 9 (attached)

Signed and Sealed this

Fifth Day of April, 2005

JON W. DUDAS  
*Director of the United States Patent and Trademark Office*